United States Patent
Kochura et al.

(10) Patent No.: US 11,423,185 B2
(45) Date of Patent: Aug. 23, 2022

(54) SENSOR BASED INTELLIGENT SYSTEM FOR ASSISTING USER WITH VOICE-BASED COMMUNICATION

(71) Applicant: International Business Machines Corporation, Armonk, NY (US)

(72) Inventors: Nadiya Kochura, Bolton, MA (US); Fang Lu, Billerica, MA (US); Anh Uong, Topsfield, MA (US)

(73) Assignee: International Business Machines Corporation, Armonk, NY (US)

( * ) Notice: Subject to any disclaimer, the term of this patent is extended or adjusted under 35 U.S.C. 154(b) by 16 days.

(21) Appl. No.: 16/985,221

(22) Filed: Aug. 5, 2020

(65) Prior Publication Data
US 2022/0043938 A1     Feb. 10, 2022

(51) Int. Cl.
*G06F 21/84* (2013.01)
*G06F 21/60* (2013.01)
(Continued)

(52) U.S. Cl.
CPC .......... *G06F 21/84* (2013.01); *G06F 3/16* (2013.01); *G06F 21/606* (2013.01); *H04L 65/75* (2022.05); *H04R 3/04* (2013.01); *H04R 2430/01* (2013.01)

(58) Field of Classification Search
CPC .......... G06F 21/84; G06F 3/16; G06F 21/606; H04L 65/601; H04R 3/04; H04R 2430/01
See application file for complete search history.

(56) References Cited

U.S. PATENT DOCUMENTS

| | | |
|---|---|---|
| 8,451,996 B2 | 5/2013 | Hanson |
| 8,630,208 B1 | 1/2014 | Kjeldaas |
| 8,831,204 B1 | 9/2014 | Pycko |
| 9,930,085 B2 | 3/2018 | Hockett |
| 10,142,485 B1 | 11/2018 | Haus |
| 10,250,973 B1 * | 4/2019 | Voigt ............... G06F 3/012 |

(Continued)

FOREIGN PATENT DOCUMENTS

| | | |
|---|---|---|
| EP | 3358838 A1 | 8/2018 |
| JP | 5568352 B2 | 2/2011 |

OTHER PUBLICATIONS

"Multiple Device Input Coordination based on Application, User and Grouping Context", IP.com No. IPCOM000238290D, IP.com Electronic Publication Date: Aug. 14, 2014, 4 pps., <https://priorart.ip.com/IPCOM/000238290>.

(Continued)

*Primary Examiner* — Fan S Tsang
*Assistant Examiner* — David Siegel
(74) *Attorney, Agent, or Firm* — Joseph P. Curcuru (57) ABSTRACT

Aspects of the present invention disclose a method for determining whether to perform mute/unmute functions to secure voice communication on multiple devices to allow for safeguarding of sensitive information of a user. The method includes one or more processors identifying one or more audio communications from a first user to a second user, wherein the one or more audio communications is transmitted utilizing a first computing device. The method further includes determining an objective of the first user based at least in part on the audio communication of the first user. The method further includes determining a set of conditions corresponding to the one or more audio communications and the objective, wherein the set of conditions indicate a vulnerability of personal data of the first user. The method further includes prohibiting the first computing device from transmitting audio data that includes the personal data of the first user.

20 Claims, 3 Drawing Sheets

(51) Int. Cl.
*H04R 3/04* (2006.01)
*G06F 3/16* (2006.01)
*H04L 65/75* (2022.01)

(56) References Cited

U.S. PATENT DOCUMENTS

| | | | | |
|---|---|---|---|---|
| 2012/0128146 A1* | 5/2012 | Boss | ............... | H04M 3/42221 379/202.01 |
| 2012/0143596 A1* | 6/2012 | Bhogal | ............... | G06F 40/40 704/9 |
| 2017/0311092 A1* | 10/2017 | Secall | ............... | H04R 25/505 |
| 2018/0336001 A1* | 11/2018 | Abuelsaad | ............... | G10L 17/22 |
| 2020/0020340 A1 | 1/2020 | Sheikh et al. | | |

OTHER PUBLICATIONS

"Natural Language Classifier", IBM, downloaded from the Internet on Jul. 23, 2020, 11 pps., <https://www.ibm.com/watson/services/natural-language-classifier/>.

"Watson Natural Language Understanding", IBM Cloud, downloaded from the Internet on Jul. 23, 2020, 8 pps , <https://www.ibm.com/watson/services/natural-language-understanding/>.

"Watson Speech to Text", IBM, downloaded from the Internet on Jul. 23, 2020, 7 pps., <https://www.ibm.com/watson/services/speech-to-text/>.

"Watson Visual Recognition", IBM Cloud, 7 pps., downloaded from the Internet on Jul. 23, 2020, <https://www.ibm.com/cloud/watson-visual-recognition>.

"Confidential Information Privacy using a Cognitive System", IP.com No. IPCOM000252890D, IP.com Electronic Publication Date: Feb. 20, 2018, 4 pps., <https://priorart.ip.com/IPCOM/000252890>.

Ram Kumar et al., "Voice Command Execution With Speech Recognition and Synthesizer", International Research Journal of Engineering and Technology (IRJET), vol. 05, Issue: 03, Mar. 2018, 5 pps., <https://www.irjet.net/archives/V5/i3/IRJET-V5I3324.pdf>.

\* cited by examiner

SENSOR BASED INTELLIGENT SYSTEM FOR ASSISTING USER WITH VOICE-BASED COMMUNICATION

BACKGROUND OF THE INVENTION

The present invention relates generally to the field of mobile devices, and more particularly to safeguarding private user data during audio communications.

In recent years, developments and the growth of Internet of Things (IoT) capable devices have created a wealth of opportunities to advance the capabilities to integrate systems. The internet of things (IoT) is the internetworking of physical devices (also referred to as "connected devices" and "smart devices"), vehicles, buildings, and other items, embedded with electronics, software, sensors, actuators, and network connectivity that enable these objects to collect and exchange data. The IoT allows objects to be sensed and/or controlled remotely across existing network infrastructure, creating opportunities for more direct integration of the physical world into computer-based systems, and resulting in improved efficiency, accuracy, and economic benefit in addition to reduced human intervention. Each thing is uniquely identifiable through its embedded computing system but is able to interoperate within the existing Internet infrastructure.

Natural language understanding (NLU) is a subset of natural language processing (NLP) that uses computer software to understand input made in the form of sentences in text or speech format. NLU understanding of natural human languages enables computers to understand commands without the formalized syntax of computer languages and for computers to communicate back to humans in their own languages. At the core of natural language processing (NLP) lies text classification. A Natural Language Classifier (NLC) allows users to classify text into custom categories, at scale. An NLC applies deep learning techniques to make predictions about the best predefined classes for short sentences or phrases.

SUMMARY

Aspects of the present invention disclose a method for determining whether to perform mute/unmute functions to secure voice communication on multiple devices to allow for safeguarding of sensitive information of a user. The method includes one or more processors identifying one or more audio communications from a first user to a second user, wherein the one or more audio communications is transmitted utilizing a first computing device. The method further includes one or more processors determining an objective of the first user based at least in part on the audio communication of the first user. The method further includes one or more processors determining a set of conditions corresponding to the one or more audio communications and the objective, wherein the set of conditions indicate a vulnerability of personal data of the first user. The method further includes one or more processors prohibiting the first computing device from transmitting audio data that includes the personal data of the first user.

DETAILED DESCRIPTION

Embodiments of the present invention allow for secure voice communication over multiple computing devices and applications to safeguard sensitive information of a user. Embodiments of the present invention identify voice commands of a user with one or more computing devices. Embodiments of the present invention determines a context of a communication and an intent of a user utilizing a computing device. Additional embodiments of the present invention utilize the context of the communication, the intent of the user, and/or sensor data of the one or more computing devices to determine whether a set of conditions corresponding to mute/unmute functions are met.

Some embodiments of the present invention recognize that challenges exist with effective and secure voice communication over multiple computing devices and/or applications that safeguard sensitive information of a user. For example, a user issues voice command to a first computing device while having an open session on a second computing device, which can create confusion, trigger incorrect and non-intended command execution, and/or reveal personal data of the user to listening parties of the open session on the second computing device. Various embodiments of the present invention can perform mute/unmute functions for preventing exposure of sensitive information of a user to an unintended party based on analysis of context of the communication and intent of a user to switch the context of the communication for the purposes of task execution.

Embodiments of the present invention can operate to increase efficiency of a computer system by reducing the amount of processing resources the computing system utilizes by reducing the amount of tasks executed that correspond to unintended voice. Additionally, various embodiments of the present invention can improve hands-free computing technologies by utilizing cognitive solutions to increase the security of the computing system.

Implementation of embodiments of the invention may take a variety of forms, and exemplary implementation details are discussed subsequently with reference to the Figures.

Figure 1:
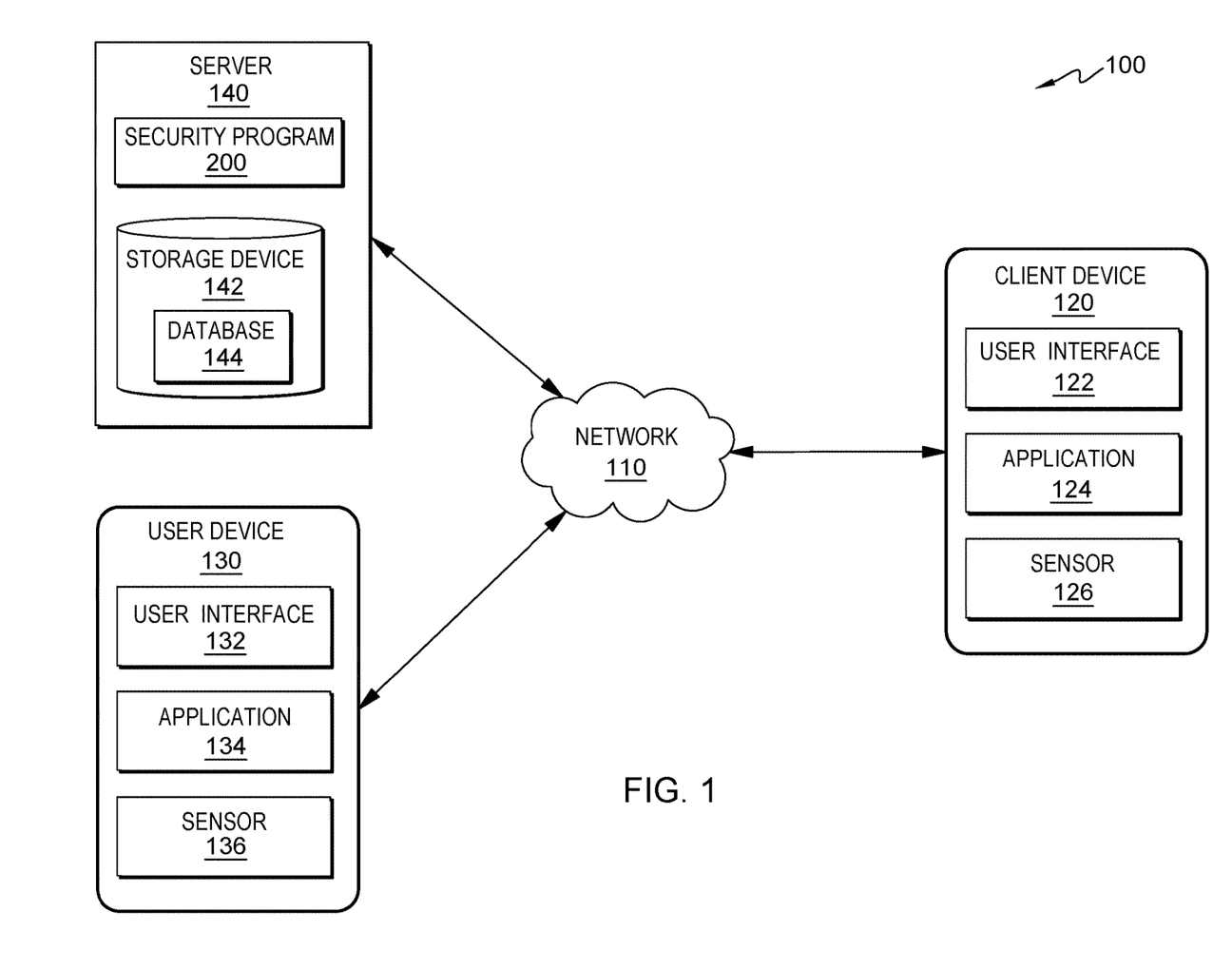
FIG. 1 is a functional block diagram of a data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

The present invention may contain various accessible data sources, such as database 144, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Security program 200 enables the authorized and secure processing of personal data. Security program 200 provides informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Security program 200 provides information regarding personal data and the nature (e.g., type, scope, purpose, duration, etc.) of the processing. Security program 200 provides the user with copies of stored personal data. Security program 200 allows the correction or completion of incorrect or incomplete personal data. Security program 200 allows the immediate deletion of personal data.

Distributed data processing environment 100 includes server 140, client device 120, and user device 130, all interconnected over network 110. Network 110 can be, for example, a telecommunications network, a local area network (LAN) a municipal area network (MAN), a wide area network (WAN), such as the Internet, or a combination of the three, and can include wired, wireless, or fiber optic connections. Network 110 can include one or more wired and/or wireless networks capable of receiving and transmitting data, voice, and/or video signals, including multimedia signals that include voice, data, and video information. In general, network 110 can be any combination of connections and protocols that will support communications between server 140 client device 120, and user device 130, and other computing devices (not shown) within distributed data processing environment 100.

Client device 120 can be one or more of a laptop computer, a tablet computer, a smart phone, smart watch, a smart speaker, virtual assistant, or any programmable electronic device capable of communicating with various components and devices within distributed data processing environment 100, via network 110. In general, client device 120 represents one or more programmable electronic devices or combination of programmable electronic devices capable of executing machine readable program instructions and communicating with other computing devices (not shown) within distributed data processing environment 100 via a network, such as network 110. Client device 120 may include components as depicted and described in further detail with respect to FIG. 3, in accordance with embodiments of the present invention.

Client device 120 includes user interface 122 and application 124. In various embodiments of the present invention, a user interface is a program that provides an interface between a user of a device and a plurality of applications that reside on the client device. A user interface, such as user interface 122, refers to the information (such as graphic, text, and sound) that a program presents to a user, and the control sequences the user employs to control the program. A variety of types of user interfaces exist. In one embodiment, user interface 122 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 122 is a script or application programming interface (API). In another embodiment, user interface 122 is a voice-user interface (VUI) that uses speech recognition to understand spoken commands and answer questions, and typically text to speech (TTS) to play a reply.

Application 124 is a computer program designed to run on client device 120. An application frequently serves to provide a user with similar services accessed on personal computers (e.g., web browser, playing music, e-mail program, or other media, etc.). In one embodiment, application 124 is mobile application software. For example, mobile application software, or an "app," is a computer program designed to run on smart phones, tablet computers and other mobile devices. In another embodiment, application 124 is a web user interface (WUI) and can display text, documents, web browser windows, user options, application interfaces, and instructions for operation, and include the information (such as graphic, text, and sound) that a program presents to a user and the control sequences the user employs to control the program. In another embodiment, application 124 is a client-side application of security program 200.

Sensor 126 is a device, module, machine, or subsystem that detects events or changes in an environment of the device and send the information to other electronics. In one embodiment, sensor 126 represents a variety of sensors of client device 120 that collects and provides various kinds of data. In this embodiment, sensor 126 provides information about a user to server 140. For example, sensor 126 can capture data corresponding to audio, gaze tracking, and body motion etc., of a user and transmit the data to database 144.

User device 130 can be one or more of a laptop computer, a tablet computer, a smart phone, smart watch, a smart speaker, virtual assistant, or any programmable electronic device capable of communicating with various components and devices within distributed data processing environment 100, via network 110. In general, user device 130 represents one or more programmable electronic devices or combination of programmable electronic devices capable of executing machine readable program instructions and communicating with other computing devices (not shown) within distributed data processing environment 100 via a network, such as network 110. User device 130 may include components as depicted and described in further detail with respect to FIG. 3, in accordance with embodiments of the present invention.

User device 130 includes user interface 132, application 134, and sensor 136. In various embodiments of the present invention, a user interface is a program that provides an interface between a user of a device and a plurality of applications that reside on the user device. A user interface, such as user interface 132, refers to the information (such as graphic, text, and sound) that a program presents to a user, and the control sequences the user employs to control the program. A variety of types of user interfaces exist. In one embodiment, user interface 132 is a graphical user interface. A graphical user interface (GUI) is a type of user interface that allows users to interact with electronic devices, such as a computer keyboard and mouse, through graphical icons and visual indicators, such as secondary notation, as opposed to text-based interfaces, typed command labels, or text navigation. In computing, GUIs were introduced in reaction to the perceived steep learning curve of command-line interfaces which require commands to be typed on the keyboard. The actions in GUIs are often performed through direct manipulation of the graphical elements. In another embodiment, user interface 132 is a script or application programming interface (API). In another embodiment, user interface 132 is a voice-user interface (VUI) that uses speech recognition to understand spoken commands and answer questions, and typically text to speech (TTS) to play a reply.

Application 134 is a computer program designed to run on user device 130. An application frequently serves to provide a user with similar services accessed on personal computers (e.g., web browser, playing music, e-mail program, or other media, etc.). In one embodiment, application 134 is mobile application software. For example, mobile application software, or an "app," is a computer program designed to run on smart phones, tablet computers and other mobile devices. In another embodiment, application 134 is a web user interface (WUI) and can display text, documents, web browser windows, user options, application interfaces, and instructions for operation, and include the information (such as graphic, text, and sound) that a program presents to a user and the control sequences the user employs to control the program. In another embodiment, application 134 is a client-side application of security program 200.

Sensor 136 is a device, module, machine, or subsystem that detects events or changes in an environment of the device and send the information to other electronics. In one embodiment, sensor 136 represents a variety of sensors of user device 130 that collects and provides various kinds of data. In this embodiment, sensor 136 provides information about a user to server 140. For example, sensor 136 can capture data corresponding to audio, gaze tracking, and body motion etc., of a user and transmit the data to database 144.

In various embodiments of the present invention, server 140 may be a desktop computer, a computer server, or any other computer systems, known in the art. In general, server 140 is representative of any electronic device or combination of electronic devices capable of executing computer readable program instructions. Server 140 may include components as depicted and described in further detail with respect to FIG. 3, in accordance with embodiments of the present invention.

Server 140 can be a standalone computing device, a management server, a web server, a mobile computing device, or any other electronic device or computing system capable of receiving, sending, and processing data. In one embodiment, server 140 can represent a server computing system utilizing multiple computers as a server system, such as in a cloud computing environment. In another embodiment, server 140 can be a laptop computer, a tablet computer, a netbook computer, a personal computer (PC), a desktop computer, a personal digital assistant (PDA), a smart phone, or any programmable electronic device capable of communicating with client device 120 and other computing devices (not shown) within distributed data processing environment 100 via network 110. In another embodiment, server 140 represents a computing system utilizing clustered computers and components (e.g., database server computers, application server computers, etc.) that act as a single pool of seamless resources when accessed within distributed data processing environment 100.

Server 140 includes storage device 142, database 144, and security program 200. Storage device 142 can be implemented with any type of storage device, for example, persistent storage 305, which is capable of storing data that may be accessed and utilized by client device 120, user device 130, and server 140, such as a database server, a hard disk drive, or a flash memory. In one embodiment storage device 142 can represent multiple storage devices within server 140. In various embodiments of the present invention, storage device 142 stores numerous types of data which may include database 144. Database 144 may represent one or more organized collections of data stored and accessed from server 140. For example, database 144 includes sensor data, voice commands, historical data, etc. In another example, historical data can include a set of conditions that correspond to a voice command or metadata (e.g., command types) of the voice command. Additionally, database 144 can include data corresponding to past interactions of a user with client device 120 via user interface 122. In one embodiment, data processing environment 100 can include additional servers (not shown) that host additional information that accessible via network 110.

Generally, security program 200 can analyze the context of a discussion of a user to determine whether to perform mute/unmute functions on multiple devices to assist a user in hands-free communication with multiple computing devices and/or applications. In one embodiment, security program 200 monitors user interface 132 of user device 130 and user interface 122 of client device 120 to identify one or more voice commands a user provides and corresponding tasks of the commands. In this example, security program 200 analyzes speech of a discussion the user transmits through client device 120 to determine whether one or more one or more sets of conditions exist to perform a mute or unmute function with respect to client device 120.

Figure 2:
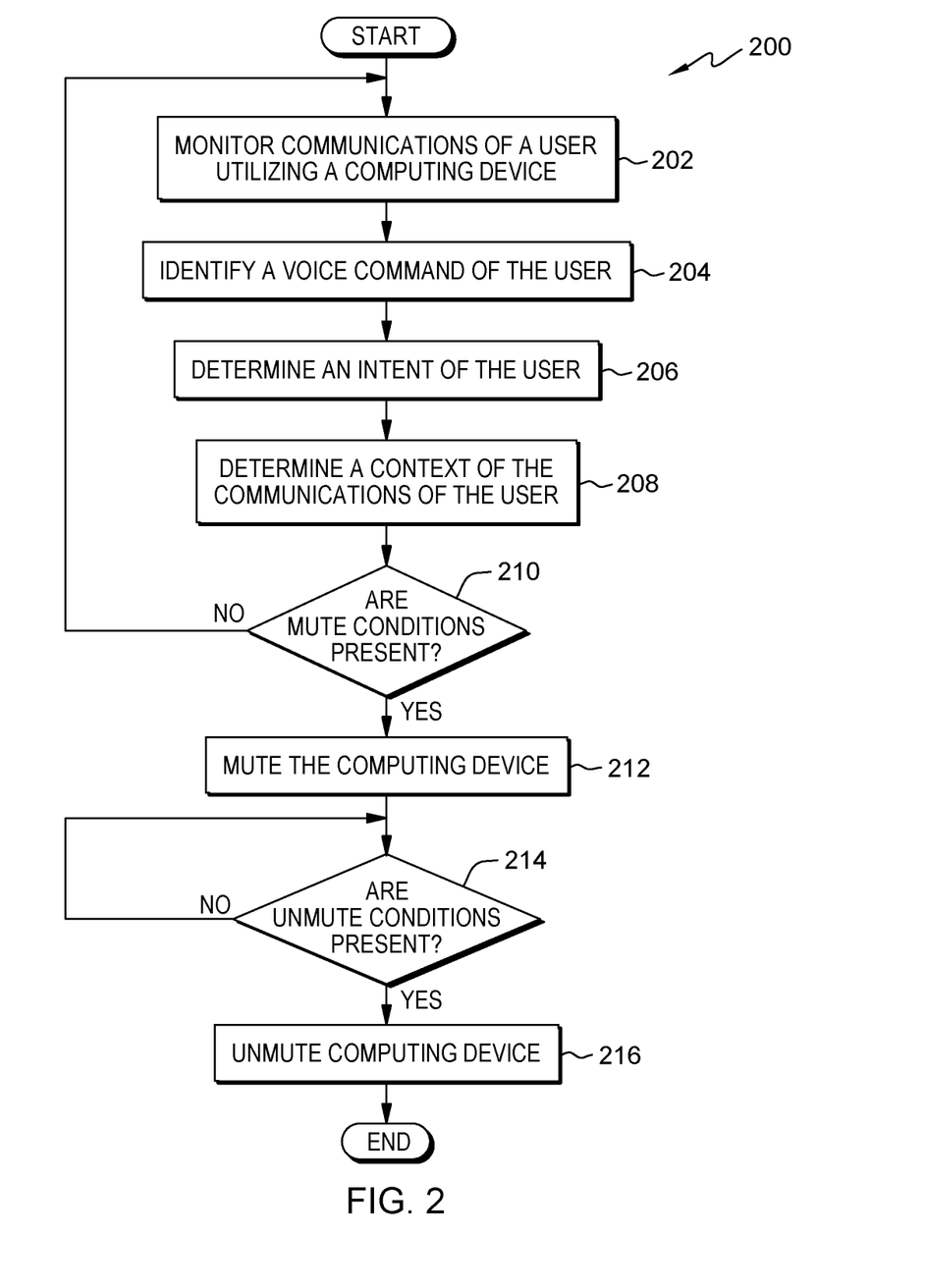
FIG. 2 is a flowchart depicting operational steps of a program, within the data processing environment of FIG. 1, for identifying the context of a discussion of a user to determine whether to perform mute/unmute functions to secure voice communication on multiple devices to allow for safeguarding sensitive information of a user, in accordance with embodiments of the present invention.

FIG. 2 is a flowchart depicting operational steps of security program 200, a program that identifies a context of a communication to determine an intent of a user based on historical data of the user communicating with other computing devices and/or applications using voice commands to automatically perform mute/unmute functions to secure sensitive information of the user, in accordance with embodiments of the present invention. In one embodiment, security program 200 initiates in response to a user connecting a computing device to security program 200 through network 110. For example, security program 200 initiates in response to a user registering (e.g., opting-in) a laptop (e.g., client device 120, user device 130) with security program 200 via a WLAN (e.g., network 110). In another embodiment, security program 200 is a background application of user device 130 that continuously monitors client device 120. For example, security program 200 is a client-side application (e.g., application 134) that initiates upon booting of a laptop (e.g., user device 130) of a user and monitors data of a mobile device (e.g., client device 120).

In step 202, security program 200 monitors communications of a user utilizing a computing device. In one embodiment, security program 200 captures audio data of a user utilizing client device 120. For example, security program 200 utilizes a microphone of a mobile device (e.g., client device 120) and/or laptop (e.g., user device 130) proximate to a user to capture audio data (e.g., speech, voice commands, discussions, etc.) of the user. In this example, security program 200 can utilize the audio data to train a synthesizer algorithm of a speech recognition system (e.g., user interface 122, user interface 132, speech to text (STT), text to speech (TTS), etc.) to identify and learn voice commands the user uses to interact with computing devices (e.g., client device 120, user device 130, etc.) over time (i.e., collects historical data). Additionally, security program 200 utilizes the audio data to determine a context of a discussion (e.g., communications) of the user.

In an example embodiment, a user communicates a voice command to user device 130 to "open a file" (e.g., folder, location, etc.) of user device 130, which requires authentication (e.g., a password, sensitive information, etc.), and "save policy records file". In the example embodiment, security program 200 utilizes a microphone of client device 120 to capture the voice command of the user and stores the voice command in database 144.

In step 204, security program 200 identifies a voice command of the user. In one embodiment, security program 200 identifies a voice command in audio data of the user to a computing device. For example, security program 200 uses a microphone of a mobile device (e.g., client device 120) to detect a voice command of a user. In this example, security program 200 utilizes learned commands (e.g., collected historical data) to determine a command type (e.g., shell, social, web) of the detected command. A shell command can relate to a directory-based system, which can be utilized to identify a location (e.g., path) in a directory of every file, folder, and application of a computing device. A social command can relate to a request-response system (e.g., interactive system), which can be utilized for "what" type of questions. A web command can relate to a web-based command system, which can be utilized to access a uniform resource locator (URL) using a default web browser (e.g., application 124, application 134). Additionally, security program 200 determines a specific task corresponding to the voice command of the user. In alternative example, security program 200 may utilize a microphone of one or more computing devices (e.g., user device 130) to detect voice commands of the user.

In the example embodiment, security program 200 utilizes a microphone (e.g., sensor 136) of user device 130 to detect a user is transmitting the voice command (e.g., open policy records file) to user device 130 and determines that the voice command corresponds to a "shell" command type. Security program 200 can then monitors user device 130 to identify the task (e.g., retrieve folder that includes policy records file) corresponding to the command and update database 144.

Generally, security program 200 can utilize natural language understanding (NLU) techniques to analyze semantic features of text input (e.g., voice commands, responses to voice commands, speech, etc.) including categories, concepts, emotion, entities, keywords, metadata, relations, semantic roles, and sentiment to determine a context or intent of a user based on audio data corresponding to communications. Additionally, security program 200 utilizes a natural language classifier (NLC), which is an ensemble of classification models, along with unsupervised and supervised learning techniques, to achieve its accuracy levels. After assembling training data (as discussed in step 202), security program 200 utilizes the NLC to evaluate textual representations of audio data against multiple support vector machines (SVMs) and a convolutional neural network (CNN) to categorize service queries (e.g., voice commands, shell commands, etc.) and corresponding tasks.

In step 206, security program 200 determines an intent of the user. In one embodiment, security program 200 utilizes audio data of a user to determine an intent of the user. For example, security program 200 monitors conversations of a user to determine an objective (e.g., intent, task, etc.) of the user. In this example, security program 200 utilizes NLU techniques to identify a topic of speech of a conversation (e.g., audio data) of a user and another party as well as a corresponding objective. Additionally, security program 200 utilizes an NLC to identify a service query (e.g., voice command, keywords, etc.) associated (e.g., relations) with the corresponding objective. Furthermore, security program 200 can utilize NLU techniques to identify metadata (e.g., command types, object locations, etc.) to determine whether the service query associated with the corresponding objective can be performed on a mobile device (e.g., client device 120, application 124, etc.) of the user.

In the example embodiment, security program 200 utilizes a microphone of client device 120 to monitor audio data (e.g., conversation) transmitted between the user and another party (e.g., insurance agent). In this example, security program 200 determines using NLU and speech of the audio data that the user and the insurance agent are discussing a policy file (e.g., topic) that the user needs to retrieve (e.g., objective, intent, task, etc.) in order to provide the insurance agent requested information. Additionally, security program 200 utilizes an NLC to identify a voice command associated with the task (e.g., retrieve) and topic (e.g., policy file) based on historical data of database 144 and determines that the voice command is a "shell" command type, which includes a location of the policy file. Furthermore, security program 200 can utilize NLU techniques to identify metadata (e.g., the policy file locations) to determine whether the voice command associated with the corresponding task can be performed on client device 120 of the user or user device 130. In one scenario, security program 200 determines that the location of the policy file points to a location of user device 130, then security program 200 can determine that the user intends to switch to another device or application to execute the corresponding task (i.e., determines the intent of the user).

In step 208, security program 200 determines a context of the communications of the user. In various embodiments of the present invention security program 200 identifies a context of an audio communication between a user and another party. Additionally, the context is a set of conditions correlated to audio communications of the user that indicate security vulnerabilities (e.g., exposure) of sensitive information (e.g., personal data) of the user, which may include voice commands, tasks corresponding to the voice commands, availability of active audio applications and/or computing devices of the user.

In one embodiment, security program 200 determines a context of audio data a user transmits to another party via client device 120. For example, security program 200 identifies one or more conditions that indicate that unintentional transmission of sensitive information of a user via a mobile device (e.g., client device 120, application 124, etc.) is probable. In this example, security program 200 determines whether an objective (e.g., intent, task, etc.) corresponding service query (e.g., voice command) is associated with exposure of sensitive information of the user. In one scenario, if security program 200 determines that a voice command (e.g., shell type command) correlates to retrieving a file (e.g., task) that requires user authentication (i.e., a user must provide a password), then security program 200 determines that a privacy condition exists. In another scenario, if security program 200 determines that a voice command (e.g., social type command) that requires a digital assistant (e.g., application 124) to generate a response (e.g., task) that includes personal identifiable information (e.g., personal data) of the user, then security program 200 determines that a privacy condition exists.

Additionally, in this example security program 200 determines whether a computing device (e.g., client device 120) can unintentionally transmit the sensitive information of the to an unintended party. In one scenario, if security program 200 determines that a mobile device (e.g., client device 120) of the user is transmitting audio data to another party, then security program 200 determines that an exposure condition exists. In another scenario, if security program 200 determines that a mobile device (e.g., client device 120) of the user is broadcasting audio data via a social media application (e.g., application 124), then security program 200 determines that an exposure condition exists.

Furthermore, in this example security program 200 identifies one or more computing devices (e.g., user device 130) within a defined proximity to the user that can perform the objective of the user. In one scenario, if security program 200 determines that one or more computing devices (e.g., user device 130) that are capable of executing the task corresponding to the voice command are within a threshold distance (e.g., audible distance of client device 120), then security program 200 determines that a proximity condition exists. In another scenario, if security program 200 determines that an active digital assistant (e.g., application 124) of a mobile device (e.g., client device 120) of the user is capable of executing the task corresponding to the voice command, then security program 200 determines that a proximity condition exists.

In decision step 210, security program 200 determines whether mute conditions are present. In one embodiment, security program 200 utilizes client device 120 and user device 130 to determine whether a set of conditions of a context exist that indicate executing a mute function of client device 120. For example, security program 200 determines whether one or more conditions of a context (as discussed in step 208) indicate that unintentional transmission of sensitive information of a user via a mobile device (e.g., client device 120, application 124, etc.) are present. In this example, security program 200 determines whether privacy, exposure, and proximity conditions exist and whether to execute a mute task of a computing device (e.g., client device 120).

In another embodiment, if security program 200 determines that a set of conditions of a context exist that does not indicate executing a mute function of client device 120 (decision step 210, "NO" branch), then security program 200 continues to monitor audio data of a user utilizing client device 120. For example, if security program 200 determines that a voice command (e.g., shell type command) correlates to retrieving a file (e.g., task) that does not require user authentication or include personally identifying information, then security program 200 continues to utilize a microphone of a mobile device (e.g., client device 120) of a user to monitor audio data (e.g., speech, voice commands, discussions, etc.) of the user.

In another embodiment, if security program 200 determines that a set of conditions of a context exist that indicates executing a mute function of client device 120 (decision step 210, "YES" branch), then security program 200 mutes client device 120. For example, security program 200 determines that a voice command (e.g., shell type command) correlates to retrieving a file (e.g., task) that requires user authentication (e.g., a password) (i.e., identifies a privacy condition) and a mobile device (e.g., client device 120) of the user is transmitting audio data to another party (i.e., identifies an exposure condition). Also, security program 200 determines that a laptop (e.g., user device 130), which is capable of executing the task corresponding to the voice command, is within a threshold distance of the mobile device (i.e., identifies a proximity condition). As a result, security program 200 prohibits the ability of a microphone of the mobile device to capture audio data of the user.

In the example embodiment, security program 200 identifies the voice command associated with the task (e.g., retrieve) and topic (e.g., policy file), which is a "shell" command that includes a location of the policy file that is password protected (i.e., identifies a privacy condition). Additionally, security program 200 determines that a user is utilizing client device 120 to speak with the insurance agent (i.e., identifies an exposure condition). Furthermore, security program 200 utilizes near field communications of client device 120 to detect user device 130 (i.e., identifies an exposure condition). As a result, security program 200 mutes the phone application the user is utilizing to speak with the insurance agent.

In another embodiment, security program 200 utilizes data of sensor(s) client device 120 or client device 130 to monitor actions of a user to confirm a set of conditions exist indicate executing a mute function of client device 120. For example, security program 200 utilizes a camera (e.g., sensor 126, sensor 136) to collect gaze tracking and body motion data of a user to confirm that the user is currently engaged (e.g., attention, interactions, etc.) with a secondary device (e.g., user device 130) or application (e.g., application 124) within proximity to the user that is capable of executing a specific task corresponding to a voice command (i.e., confirms the set of conditions indicate to mute client device 120).

In step 212, security program 200 mutes the computing device. In one embodiment, security program 200 mutes client device 120. For example, security program 200 disables a microphone (e.g., sensor 126) of a mobile device (e.g., client device 120) of the user, which prohibits the collection of audio data of an operating environment of the user. In another example, security program 200 utilizes the set of conditions as discussed in step 210 to determine whether to delegate a mute task to the application specific agent (e.g., application 124) or to a computing device (e.g., client device 120) mute function.

In decision step 214, security program 200 determines whether unmute conditions are present. In one embodiment, security program 200 utilizes a status of a task corresponding to a service query user device 130 performs to determine whether to execute an unmute function of client device 120. For example, security program 200 determines a status of a task corresponding to a voice command of a user that a digital assistant (e.g., user device 130) performs and whether to execute an unmute task of a computing device (e.g., client device 120). In another embodiment, security program 200 utilizes client device 120 and user device 130 to determine whether a set of conditions exist that indicate executing an unmute function of client device 120. For example, security program 200 determines whether one or more conditions indicate that unintentional transmission of sensitive information of a user via a mobile device (e.g., client device 120, application 124, etc.) are no longer present. In this example, security program 200 determines whether privacy, exposure, and proximity conditions exist and whether to execute an unmute task of a computing device (e.g., client device 120).

In another embodiment, if security program 200 determines that a set of conditions do not exist that indicate executing an unmute function of client device 120 (decision step 214, "NO" branch), then security program 200 continues to monitor conditions of an operating environment of client device 120. For example, if security program 200 determines that privacy, exposure, and proximity conditions are present in an operating environment of a mobile device (e.g., client device 120), then security program 200 does not execute an unmute task of the mobile device and continues to monitor conditions of the operating environment of the mobile device.

In another embodiment, if security program 200 determines that a set of conditions exist that indicate executing an unmute function of client device 120 (decision step 214, "YES" branch), then security program 200 unmutes client device 120 (step 216). For example, if security program 200 determines that a privacy condition is not present in an operating environment of a mobile device (e.g., client device 120) (i.e., the information corresponding to the user is not sensitive), then security program 200 allows a microphone (e.g., sensor 126) of the mobile device to capture audio data of the user.

In the example embodiment, security program 200 identifies the voice command associated with the task (e.g., retrieve) and topic (e.g., policy file), which is a "shell" command that includes a location of the policy file that is password protected (i.e., privacy condition is present). Additionally, security program 200 determines that user device 130 completed the task (i.e., an exposure condition is no longer possible). As a result, security program 200 unmutes the phone application (e.g., sensor 126) the user is utilizing to speak with the insurance agent.

In step 216, security program 200 unmutes the computing device. In one embodiment, security program 200 unmutes client device 120. For example, security program 200 enables a microphone (e.g., sensor 126) of a mobile device (e.g., client device 120) of the user, which allows the collection of audio data of an operating environment of the user. In another example, security program 200 utilizes the set of conditions as discussed in step 210 to determine whether to delegate an unmute task to the application specific agent (e.g., application 124) or to a computing device (e.g., client device 120) mute function. In another embodiment, security program 200 unmutes client device 120 in response to detecting a command of a user. More specifically, in response to security program 200 detecting a voice command of a user to unmute mobile device (e.g., client device 120), security program 200 transmitting instructions to execute a task to reenable a microphone of the mobile device.

Figure 3:
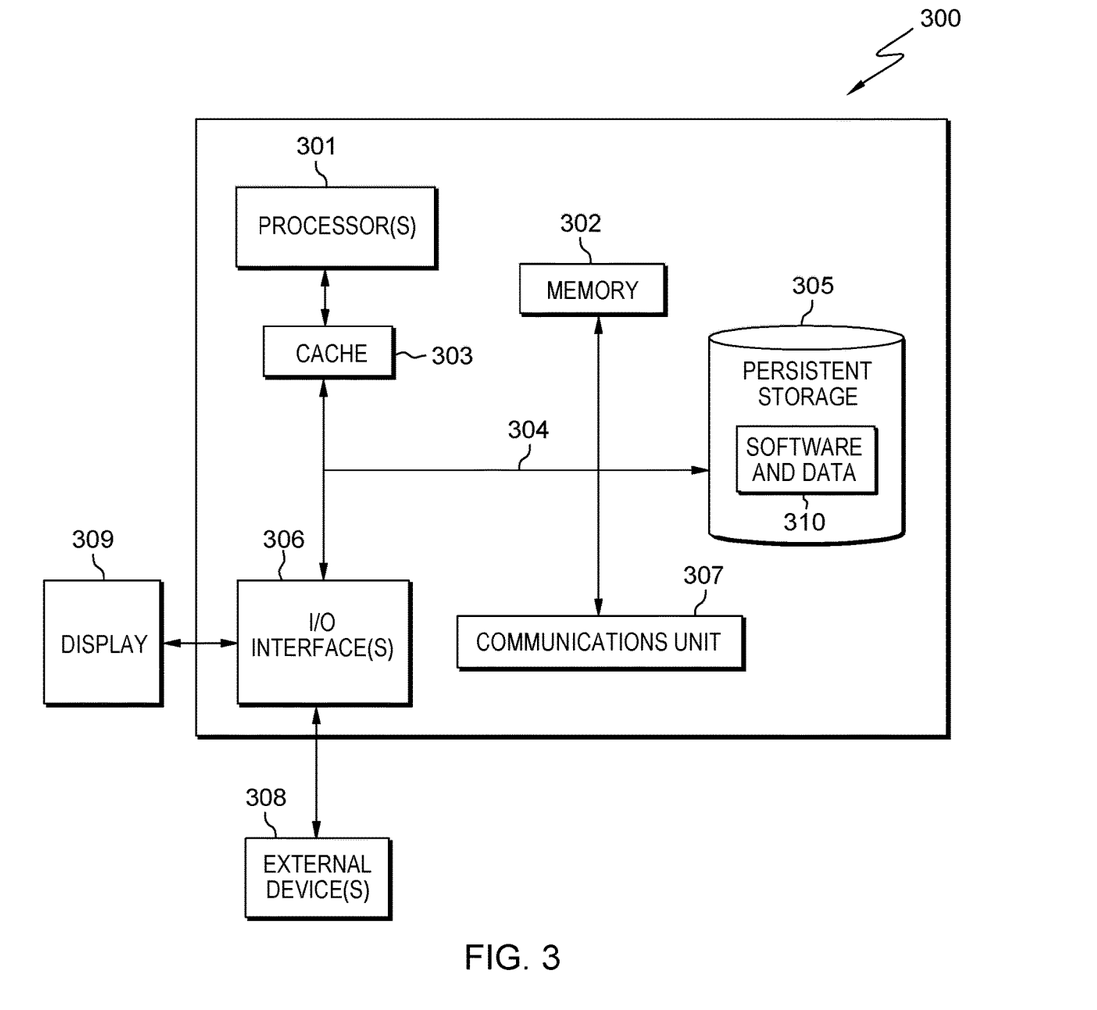
FIG. 3 is a block diagram of components of the client device and server of FIG. 1, in accordance with an embodiment of the present invention.

FIG. 3 depicts a block diagram of components of client device 120, user device 130 and server 140, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

FIG. 3 includes processor(s) 301, cache 303, memory 302, persistent storage 305, communications unit 307, input/output (I/O) interface(s) 306, and communications fabric 304. Communications fabric 304 provides communications between cache 303, memory 302, persistent storage 305, communications unit 307, and input/output (I/O) interface(s) 306. Communications fabric 304 can be implemented with any architecture designed for passing data and/or control information between processors (such as microprocessors, communications and network processors, etc.), system memory, peripheral devices, and any other hardware components within a system. For example, communications fabric 304 can be implemented with one or more buses or a crossbar switch.

Memory 302 and persistent storage 305 are computer readable storage media. In this embodiment, memory 302 includes random access memory (RAM). In general, memory 302 can include any suitable volatile or non-volatile computer readable storage media. Cache 303 is a fast memory that enhances the performance of processor(s) 301 by holding recently accessed data, and data near recently accessed data, from memory 302.

Program instructions and data (e.g., software and data 310) used to practice embodiments of the present invention may be stored in persistent storage 305 and in memory 302 for execution by one or more of the respective processor(s) 301 via cache 303. In an embodiment, persistent storage 305 includes a magnetic hard disk drive. Alternatively, or in addition to a magnetic hard disk drive, persistent storage 305 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 305 may also be removable. For example, a removable hard drive may be used for persistent storage 305. Other examples include optical and magnetic disks, thumb drives, and smart cards that are inserted into a drive for transfer onto another computer readable storage medium that is also part of persistent storage 305. Software and data 310 can be stored in persistent storage 305 for access and/or execution by one or more of the respective processor(s) 301 via cache 303. With respect to client device 120, software and data 310 includes data of user interface 122, application 124, and sensor 126. With respect to user device 130, software and data 310 includes data of user interface 132, application 134, and sensor 136. With respect to server 140, software and data 310 includes data of storage device 142 and security program 200.

Communications unit 307, in these examples, provides for communications with other data processing systems or devices. In these examples, communications unit 307 includes one or more network interface cards. Communications unit 307 may provide communications through the use of either or both physical and wireless communications links. Program instructions and data (e.g., software and data 310) used to practice embodiments of the present invention may be downloaded to persistent storage 305 through communications unit 307.

I/O interface(s) 306 allows for input and output of data with other devices that may be connected to each computer system. For example, I/O interface(s) 306 may provide a connection to external device(s) 308, such as a keyboard, a keypad, a touch screen, and/or some other suitable input device. External device(s) 308 can also include portable computer readable storage media, such as, for example, thumb drives, portable optical or magnetic disks, and memory cards. Program instructions and data (e.g., software and data 310) used to practice embodiments of the present invention can be stored on such portable computer readable storage media and can be loaded onto persistent storage 305 via I/O interface(s) 306. I/O interface(s) 306 also connect to display 309.

Display 309 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
identifying, by one or more processors, one or more audio communications from a first user to a second user, wherein the one or more audio communications is transmitted utilizing a first computing device;
determining, by one or more processors, an objective of the first user based at least in part on the audio communication of the first user and at least in part on identified metadata to determine when a service query associated with the objective can be performed on the first computing device;
determining, by one or more processors, a set of conditions corresponding to the one or more audio communications and the objective, wherein the set of conditions indicate a vulnerability of personal data of the first user; and
prohibiting, by one or more processors, the first computing device from transmitting audio data that includes the personal data of the first user.

2. The method of claim 1, further comprising:
in response to determining that the set of conditions that indicate the vulnerability no longer exist, enabling, by one or more processors, the first computing device to transmit audio data to the second user.

3. The method of claim 1, further comprising:
confirming, by one or more processors, an indication of the set of conditions based at least in part on sensor data of the first computing device, wherein confirming further comprises:
identifying, by one or more processors, one or more actions of the first user that confirm whether the first user is currently engaged with the first computing device.

4. The method of claim 1, further comprising:
identifying, by one or more processors, a service query associated with the objective of the first user; and
determining, by one or more processors, whether a task corresponding to the service query is intended for execution on a second computing device.

5. The method of claim 4, wherein determining the set of conditions corresponding to the one or more audio communications and the objective, further comprises:
determining, by one or more processors, whether the task corresponding to the service query is associated with the personal data of the first user;
determining, by one or more processors, whether the first computing device is capable of unintentionally transmitting the personal data of the first user to the second user; and
determining, by one or more processors, whether a second computing device is within a threshold distance to the first user, wherein the second computing device is capable of executing the task corresponding to the service query.

6. The method of claim 1, wherein prohibiting the first computing device from transmitting audio data that includes the personal data of the first user, further comprises:
determining, by one or more processors, whether to delegate a mute task to an application specific agent of the first computing device based at least in part on a condition of the set of conditions.

7. The method of claim 2, wherein enabling the first computing device to transmit audio data to the second user, further comprises:
identifying, by one or more processors, a completion status of a task corresponding to the objective of the first user, wherein the task corresponds to transmitting audio data that includes the personal data of the first user.

8. A computer program product comprising:
one or more computer readable storage media and program instructions stored on the one or more computer readable storage media, the program instructions comprising:
program instructions to identify one or more audio communications from a first user to a second user, wherein the one or more audio communications is transmitted utilizing a first computing device;
program instructions to determine an objective of the first user based at least in part on the audio communication of the first user and at least in part on identified metadata to determine when a service query associated with the objective can be performed on the first computing device;
program instructions to determine a set of conditions corresponding to the one or more audio communications and the objective, wherein the set of conditions indicate a vulnerability of personal data of the first user; and
program instructions to prohibit the first computing device from transmitting audio data that includes the personal data of the first user.

9. The computer program product of claim 8, further comprising program instructions, stored on the one or more computer readable storage media, to:
in response to determining that the set of conditions that indicate the vulnerability no longer exist, enable the first computing device to transmit audio data to the second user.

10. The computer program product of claim 8, further comprising program instructions, stored on the one or more computer readable storage media, to:
confirm an indication of the set of conditions based at least in part on sensor data of the first computing device, wherein confirming further comprises program instructions, stored on the one or more computer readable storage media, to:
identify one or more actions of the first user that confirm whether the first user is currently engaged with the first computing device.

11. The computer program product of claim 8, further comprising program instructions, stored on the one or more computer readable storage media, to:
identify a service query associated with the objective of the first user; and
determine whether a task corresponding to the service query is intended for execution on a second computing device.

12. The computer program product of claim 11, further comprising program instructions, stored on the one or more computer readable storage media, to:
determine whether the task corresponding to the service query is associated with the personal data of the first user;

determine whether the first computing device is capable of unintentionally transmitting the personal data of the first user to the second user; and determine whether a second computing device is within a threshold distance to the first user, wherein the second computing device is capable of executing the task corresponding to the service query.

13. The computer program product of claim 8, wherein program instructions to prohibit the first computing device from transmitting audio data that includes the personal data of the first user, further comprise program instructions to:

determine whether to delegate a mute task to an application specific agent of the first computing device based at least in part on a condition of the set of conditions.

14. The computer program product of claim 9, wherein program instructions to enable the first computing device to transmit audio data to the second user, further comprise program instructions to:

identify a completion status of a task corresponding to the objective of the first user, wherein the task corresponds to transmitting audio data that includes the personal data of the first user.

15. A computer system comprising:

one or more computer processors;

one or more computer readable storage media; and program instructions stored on the computer readable storage media for execution by at least one of the one or more processors, the program instructions comprising:

program instructions to identify one or more audio communications from a first user to a second user, wherein the one or more audio communications is transmitted utilizing a first computing device;

program instructions to determine an objective of the first user based at least in part on the audio communication of the first user and at least in part on identified metadata to determine when a service query associated with the objective can be performed on the first computing device;

program instructions to determine a set of conditions corresponding to the one or more audio communications and the objective, wherein the set of conditions indicate a vulnerability of personal data of the first user; and program instructions to prohibit the first computing device from transmitting audio data that includes the personal data of the first user.

16. The computer system of claim 15, further comprising program instructions, stored on the one or more computer readable storage media for execution by at least one of the one or more processors, to:

in response to determining that the set of conditions that indicate the vulnerability no longer exist, enable the first computing device to transmit audio data to the second user.

17. The computer system of claim 15, further comprising program instructions, stored on the one or more computer readable storage media for execution by at least one of the one or more processors, to:

confirm an indication of the set of conditions based at least in part on sensor data of the first computing device, wherein confirming further comprises program instructions, stored on the one or more computer readable storage media, to:

identify one or more actions of the first user that confirm whether the first user is currently engaged with the first computing device.

18. The computer system of claim 15, further comprising program instructions, stored on the one or more computer readable storage media for execution by at least one of the one or more processors, to:

identify a service query associated with the objective of the first user; and determine whether a task corresponding to the service query is intended for execution on a second computing device.

19. The computer system of claim 18, further comprising program instructions, stored on the one or more computer readable storage media for execution by at least one of the one or more processors, to:

determine whether the task corresponding to the service query is associated with the personal data of the first user;

determine whether the first computing device is capable of unintentionally transmitting the personal data of the first user to the second user; and determine whether a second computing device is within a threshold distance to the first user, wherein the second computing device is capable of executing the task corresponding to the service query.

20. The computer system of claim 15, wherein program instructions to prohibit the first computing device from transmitting audio data that includes the personal data of the first user, further comprise program instructions to:

identify a completion status of a task corresponding to the objective of the first user, wherein the task corresponds to transmitting audio data that includes the personal data of the first user.

\* \* \* \* \*